United States Patent
Kumar et al.

(10) Patent No.: US 11,221,426 B2
(45) Date of Patent: Jan. 11, 2022

(54) METHOD FOR IMPROVED PROCESSING OF DATA WITH TIME OVERLAPPING RECORDINGS OF ENERGY SOURCES

(71) Applicant: DownUnder GeoSolutions Pty Ltd., West Perth (AU)

(72) Inventors: Amarjeet Kumar, West Perth (AU); Gary Hampson, Peppermint Cove (AU); Troy A. Thompson, Duncraig (AU)

(73) Assignee: DownUnder GeoSolutions Pty Ltd., West Perth (AU)

( * ) Notice: Subject to any disclaimer, the term of this patent is extended or adjusted under 35 U.S.C. 154(b) by 80 days.

(21) Appl. No.: 16/693,536

(22) Filed: Nov. 25, 2019

(65) Prior Publication Data

US 2020/0096661 A1 Mar. 26, 2020

Related U.S. Application Data

(63) Continuation of application No. PCT/US2018/035742, filed on Jun. 1, 2018.
(Continued)

(51) Int. Cl.
*G01V 1/32* (2006.01)
*G01V 1/28* (2006.01)
(Continued)

(52) U.S. Cl.
CPC .............. *G01V 1/32* (2013.01); *G01V 1/282* (2013.01); *G01V 1/38* (2013.01); *G06F 17/16* (2013.01)

(58) Field of Classification Search
CPC .......... G01V 1/32; G01V 1/282; G01V 1/325; G01V 1/34; G01V 1/368; G01V 1/38;
(Continued)

(56) References Cited

U.S. PATENT DOCUMENTS

2004/0151356 A1  8/2004  Li et al.
2013/0176819 A1*  7/2013  Poole ................ G01V 1/34
                                                        367/38
(Continued)

FOREIGN PATENT DOCUMENTS

WO    2016/110738 A1    7/2016

OTHER PUBLICATIONS

Chen et al., Deblending by Iterative Orthogonalization and Seislet Thresholding, 2015 SEG New Orleans Annual Meeting, pp. 53-58 (Year: 2015).*

(Continued)

*Primary Examiner* — Toan M Le
(74) *Attorney, Agent, or Firm* — Richard A. Fagin

(57) ABSTRACT

A method for deblending seismic signals includes entering as input to a computer recorded signals comprising seismic energy from a plurality of actuations of one or more seismic energy sources. A model of deblended seismic data and a blending matrix are initialized. A blending matrix inversion is performed using the initialized model. The inversion includes using a scaled objective function. The inversion is constrained by a thresholding operator. The thresholding operator is arranged to recover coefficients of the model of the deblended seismic data that are substantially nonzero, against a Gaussian white noise background. The thresholded model is projected into data space. Performing the blending matrix inversion is repeated if a data residual exceeds a selected threshold and the inversion is terminated if the data residual is below the selected threshold. At least one of storing and displaying an output of the blending matrix inversion is performed when the blending matrix inversion is terminated.

28 Claims, 10 Drawing Sheets

Related U.S. Application Data

(60) Provisional application No. 62/516,768, filed on Jun. 8, 2017.

(51) Int. Cl.
*G01V 1/38* (2006.01)
*G06F 17/16* (2006.01)

(58) Field of Classification Search
CPC ..... G01V 2210/20; G01V 2210/44–48; G01V 2210/127; G06F 17/16
See application file for complete search history.

(56) References Cited

U.S. PATENT DOCUMENTS

| | | |
|---|---|---|
| 2014/0195162 A1 | 7/2014 | Poole |
| 2015/0236668 A1 | 8/2015 | Poole et al. |
| 2015/0241587 A1* | 8/2015 | Baardman .............. G01V 1/364 702/17 |
| 2015/0268331 A1 | 9/2015 | Koehler et al. |
| 2015/0331124 A1 | 11/2015 | Haacke et al. |
| 2016/0245942 A1 | 8/2016 | Poole et al. |

OTHER PUBLICATIONS

Kontakis et al., Combined Focal and Coherency-Based Deblending Strategy, Oct. 18-23, 2015, 2015 SEG Annual Meeting, 6 pp. (Year: 2015).*
Kontakis et al._Bio, Mar. 13, 2021, 3 pp. (Year: 2021).*
One_Petro_Search, Mar. 11, 2021, 10 pp. (Year: 2021).*
One_Petro_Search_Result, Mar. 13, 2021, 7 pp. (Year: 2021).*
Kutscha. "The double focal transformation and its application to data reconstruction." 31 13,19, Jan. 26, 2014, chapter 1.
Kutscha. "The double focal transformation and its application to data reconstruction." 31 13,19, Jan. 26, 2014, chapter 2.
Kutscha. "The double focal transformation and its application to data reconstruction." 31 13,19, Jan. 26, 2014, chapter 3.
Search Report and Written Opinion, International Application No. PCT/US2018/035742 dated Sep. 7, 2018.
Australian Examination Report dated Sep. 15, 2020, for Application No. 2018282093.

* cited by examiner

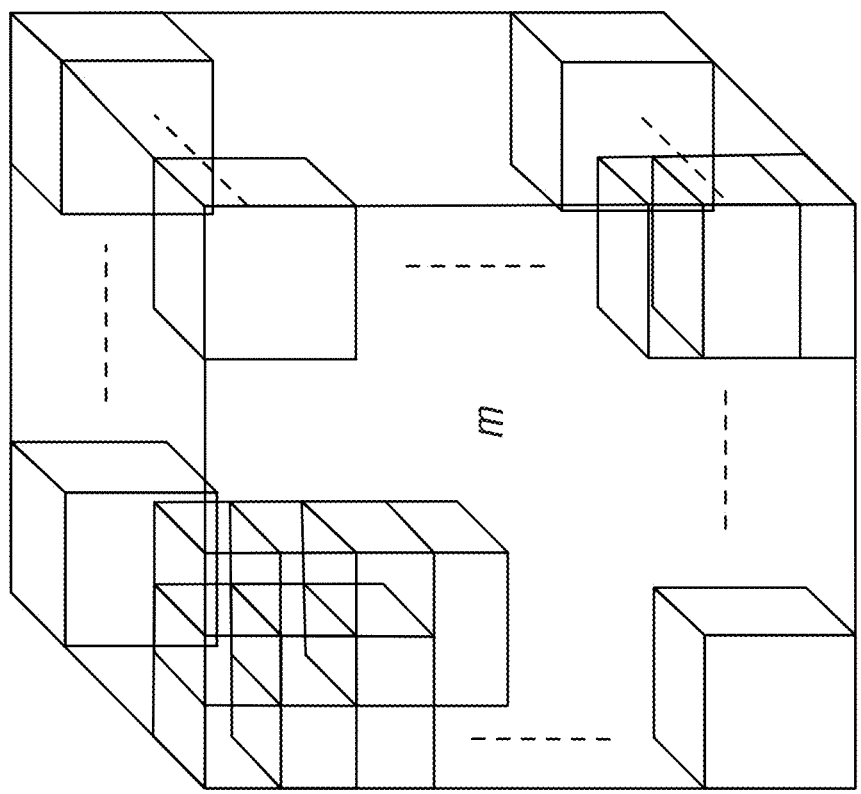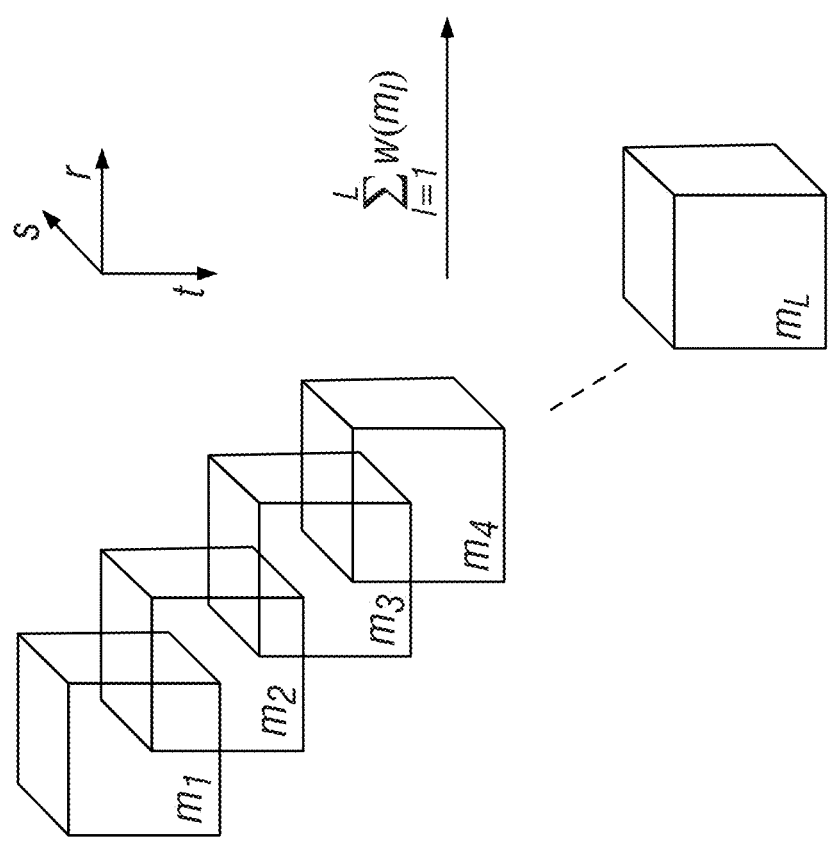
FIG. 6

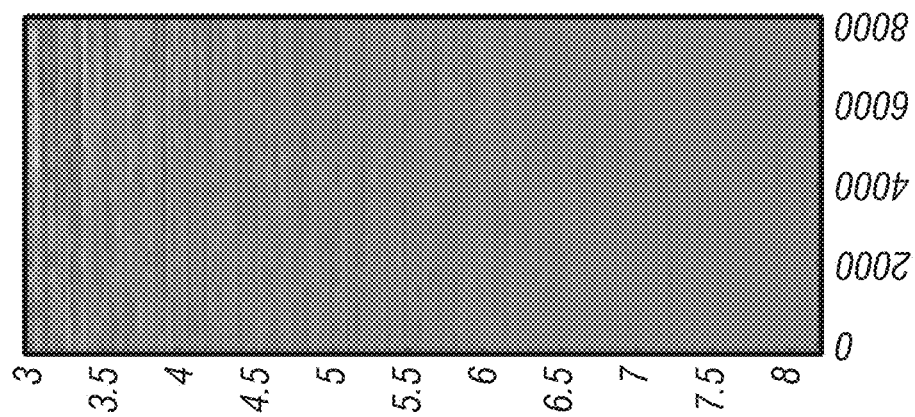
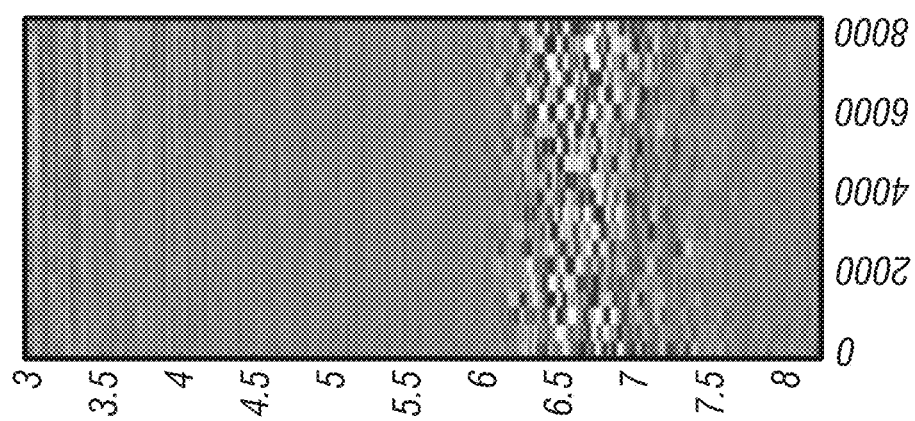
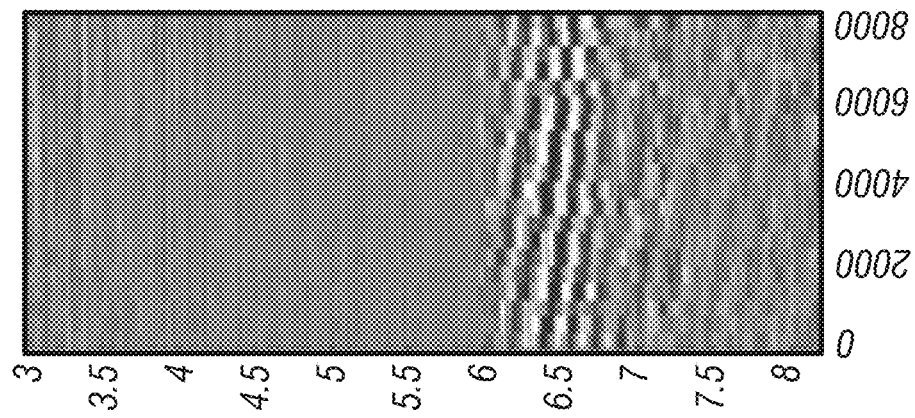
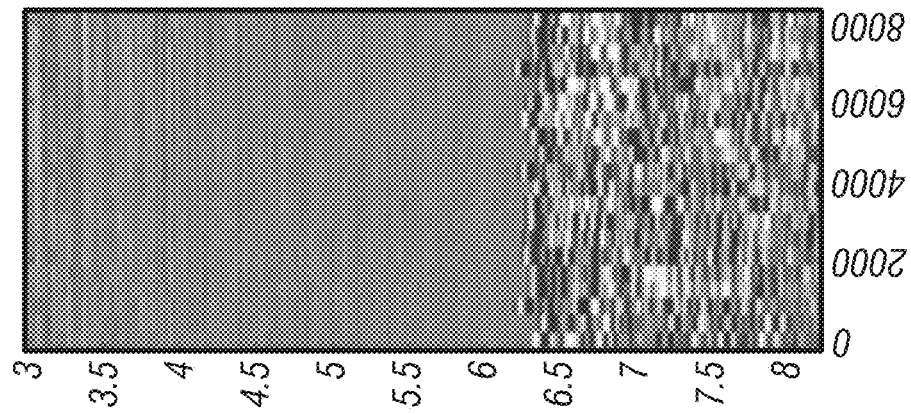

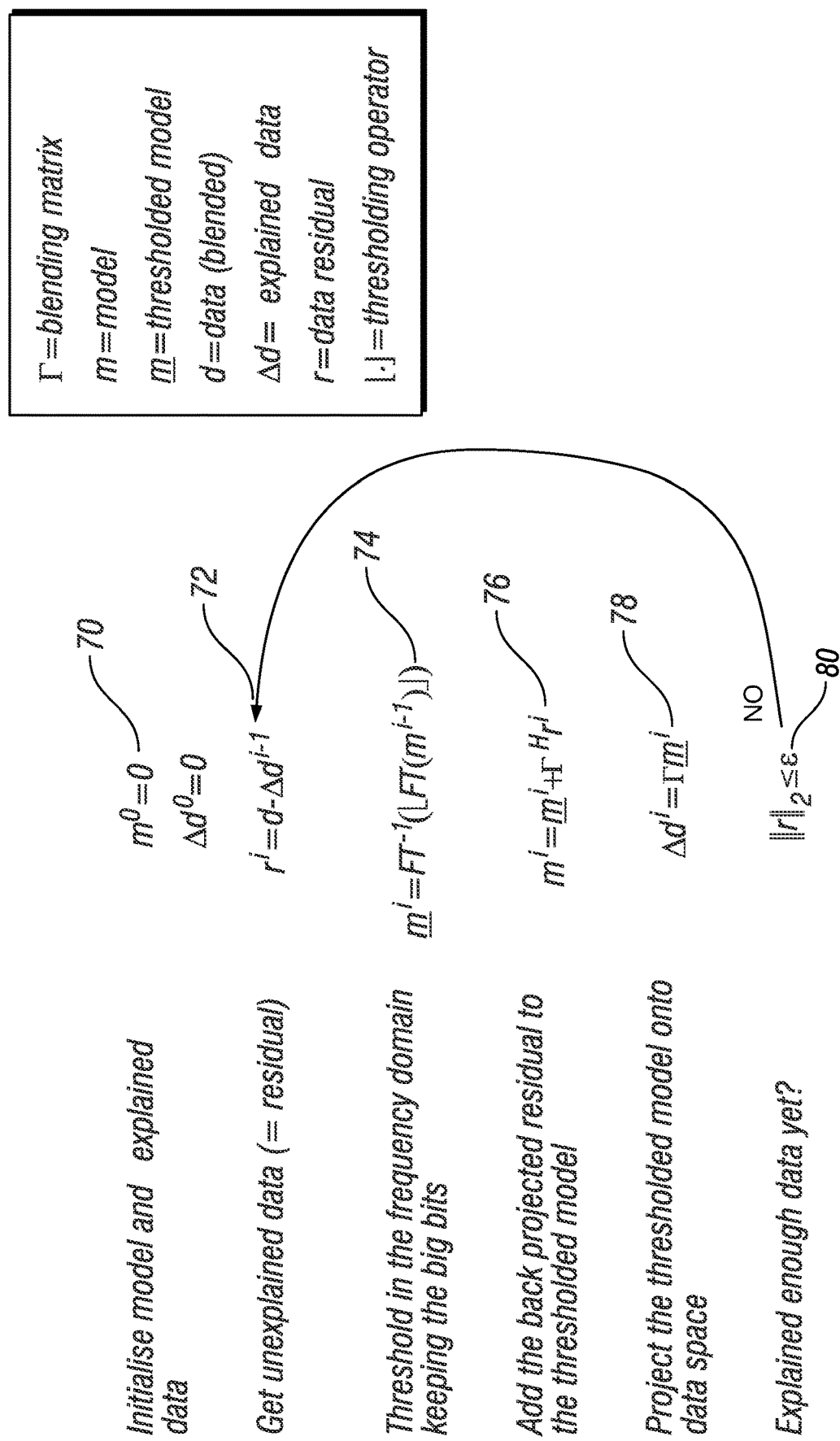

METHOD FOR IMPROVED PROCESSING OF DATA WITH TIME OVERLAPPING RECORDINGS OF ENERGY SOURCES

CROSS REFERENCE TO RELATED APPLICATIONS

Continuation of International Application No. PCT/US2018/035742 filed on Jun. 1, 2018. Priority is claimed from U.S. Provisional Application No. 62/516,768 filed on Jun. 8, 2017. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates generally to the field of seismic exploration. More specifically, the disclosure relates to methods for acquiring and processing seismic signals having at least some time overlapping recorded portions between successive actuations of one or more seismic energy sources.

U.S. Pat. No. 6,882,938 issued to Vaage et al. discloses a method for separating energy from separate seismic energy sources includes that the separate sources are actuated to provide a variable time delay between successive actuations of a first one and a second one of the sources. The disclosed method includes sorting the seismic signals such that events therein resulting from actuations of the first source are substantially coherent in all spatial directions, coherency filtering the first source coherency sorted signals, sorting the seismic signals such that events therein resulting from actuations of the second source are substantially coherent in all spatial directions, and coherency filtering the second source coherency sorted signals interfering seismic energy sources.

So-called "blended" seismic data acquisition (See, Berkhout et al., 2008) has enjoyed increasing popularity recently because it is realizing some of the potential economic and spatial sampling benefits it promised. However, actuations of seismic sources ("shots") that overlap in time currently need to be separated (deblended) so that they can be processed as if they had been acquired without overlap. When a shot is fired on top of weak signal from an earlier shot, recovery of the weak signal is a well-known significant challenge. Recently, Maraschini et al. (2016a, b) have addressed such problems and proposed a two-step noise attenuation process to preserve as much as possible weak signal using a robust rank reduction filter (Trickett et al., 2012). However, their result shows that the weak signal is still not recovered completely especially in deeper part of the shot record and the method also suffers from the strong noise reducing side effects.

The key observation in the source separation problem is that as long as the sources are fired at suitably randomly dithered times, the resulting source cross-talk will appear as random noise in specific trace gather domains such as the common offset and common receiver domains, turning the separation problem into a noise-removal procedure. Inversion type deblending methods (Akerberg et al., 2008; Moore et al., 2008; van Borselen et al., 2012) take advantage of sparse representations of coherent seismic signals. Recently, various rank-minimization-based techniques have been applied to separating simultaneous seismic data (Maraschini et al., 2012; Cheng and Sacchi, 2015; Kumar et al., 2015). The general idea is to exploit the low rank structure of seismic data when it is organized in some transform domain. Low-rank structure refers to the small number of nonzero singular values, or quickly decaying singular values. Other deblending techniques focus on the iterative removal of the blending noise (e.g., Mahdad et al., 2011; Doulgeris et al., 2012; Beasley et al., 2012; Abma et al., 2015) or on simultaneously deriving model representations for both sources based on source firing time information (Akerberg et al., 2008).

There continues to be a need for improved methods for separating energy from interfering seismic energy sources in order to improve operating efficiency during seismic data acquisition.

SUMMARY

A method for deblending seismic signals according to one aspect of the disclosure includes entering as input to a computer recorded signals comprising seismic energy from a plurality of actuations of one or more seismic energy sources. In the computer, a model of deblended seismic data and a blending matrix is initialized. In the computer, a blending matrix inversion is performed using the initialized model, the inversion comprising using a scaled objective function. The inversion is constrained by a thresholding operator. The thresholding operator is arranged to recover coefficients of the model of the deblended seismic data that are nonzero against a blending noise background. In the computer, the thresholded model is projected into data space. At least one of repeating performing the blending matrix inversion if a data residual exceeds a selected threshold and terminating the blending matrix inversion if the data residual is below the selected threshold is performed, wherein during repeating performing the blending matrix inversion, a thresholding schedule is applied. In the computer, at least one of storing and displaying an output of the blending matrix inversion is performed when the blending matrix inversion is terminated.

In some embodiments the thresholding of the model is performed in overlapping sub-volumes or N-dimensional windows of pre-determined size, the individual results of the thresholding in sub-volumes or N-dimensional windows are linearly re-combined.

In some embodiments a thresholding function comprises quadratic thresholding.

In some embodiments a thresholding function comprises a smooth function with continuous first and second derivatives in the region above the threshold level.

In some embodiments a thresholding function comprises a function of the form:

$$T_\tau(x_i) = \begin{cases} x_i(1 - \tau^n/|x_i|^n) & |x_i| > \tau \\ 0 & |x_i| \leq \tau \end{cases}$$

for n>1, wherein T represents a thresholding function, $\tau$ represents the threshold value, and x represents a coefficient.

In some embodiments the thresholding schedule consists of lowering the value of the threshold exponentially to zero.

In some embodiments an N-dimensional transform for the thresholding is the Fourier transform.

In some embodiments an N-dimensional transform for the thresholding is a curvelet transform.

In some embodiments an N-dimensional transform for the thresholding comprises a tau-p transform.

In some embodiments an N-dimensional transform for the thresholding is the parabolic radon transform.

In some embodiments an N-dimensional transform for the thresholding comprises a hyperbolic radon transform.

In some embodiments an N-dimensional transform for the thresholding is the single or double focal transform.

In some embodiments an N-dimensional transform for the thresholding is based upon at least one of the following functions: Activelet, AMlet, Armlet, Bandlet, Barlet, Bathlet, Beamlet, Binlet, Bumplet, Brushlet, Caplet, Camplet, Chirplet, Chordlet, Circlet, Coiflet, Contourlet, Cooklet, Craplet, Cubelet, CURElet, Daublet, Directionlet, Dreamlet, Edgelet, FAMlet, FLaglet, Flatlet, Fourierlet, Framelet, Fresnelet, Gaborlet, GAMlet, Gausslet, Graphlet, Grouplet, Haarlet, Haardlet, Heatlet, Hutlet, Hyperbolet, Icalet (Icalette), Interpolet, Loglet, Marrlet, MIMOlet, Monowavelet, Morelet, Morphlet, Multiselectivelet, Multiwavelet, Needlet, Noiselet, Ondelette, Ondulette, Prewavelet, Phaselet, Planelet, Platelet, Purelet, QVlet, Radonlet, RAMlet, Randlet, Ranklet, Ridgelet, Riezlet, Ripplet (original, type-I and II), Scalet, S2let, Seamlet, Seislet, Shadelet, Shapelet, Shearlet, Sinclet, Singlet, Slantlet, Smoothlet, Snakelet, SOHOlet, Sparselet, Spikelet, Splinelet, Starlet, Steerlet, Stockeslet, SURE-let (SURElet), Surfacelet, Surflet, Symmlet, S2let, Tetrolet, Treelet, Vaguelette, Wavelet-Vaguelette, Wavelet, Warblet, Warplet, Wedgelet, Xlet.

A method for seismic surveying according to another aspect of the disclosure includes actuating at least one seismic energy source such that energy from different actuations of the at least one source is present in at least one recording of seismic signals detected in response to the actuations of the at least one seismic energy source. Recorded signals of the detected seismic energy are entered as input to a computer. In the computer, a model of deblended seismic data and a blending matrix is initialized. In the computer, a blending matrix inversion using the initialized model is performed, wherein the inversion comprises using a scaled objective function. The inversion is constrained by a thresholding operator, wherein the thresholding operator is arranged to recover coefficients of the model of the deblended seismic data that are nonzero against a blending noise background. In the computer, the thresholded model is projected into data space. The blending matrix inversion is repeated if a data residual exceeds a selected threshold and the blending matrix inversion is terminated if the data residual is below the selected threshold, wherein during the repeated performing the blending matrix inversion applies a thresholding schedule. At least one of storing and displaying an output of the blending matrix inversion is performed in the computer when the blending matrix inversion is terminated.

In some embodiments the thresholding of the model is performed in overlapping sub-volumes or N-dimensional windows of pre-determined size, the results of the thresholding in sub-volumes or N-dimensional windows are linearly re-combined.

In some embodiments a thresholding function comprises quadratic thresholding.

In some embodiments a thresholding function comprises a smooth function with continuous first and second derivatives in the region above the threshold level.

In some embodiments a thresholding function comprises a function of the form:

$$T_\tau(x_i) = \begin{cases} x_i(1 - \tau^n/|x_i|^n) & |x_i| > \tau \\ 0 & |x_i| \leq \tau \end{cases}$$

for n>1, and wherein T represents a thresholding function, $\tau$ represents the threshold value, and x represents a coefficient.

In some embodiments the thresholding schedule consists of lowering the value of the threshold exponentially to zero.

In some embodiments an N-dimensional transform for the thresholding is the Fourier transform.

In some embodiments an N-dimensional transform for the thresholding is a curvelet transform.

In some embodiments an N-dimensional transform for the thresholding comprises a tau-p transform.

In some embodiments an N-dimensional transform for the thresholding is the parabolic radon transform.

In some embodiments an N-dimensional transform for the thresholding comprises a hyperbolic radon transform.

In some embodiments an N-dimensional transform for the thresholding is the single or double focal transform.

In some embodiments an N-dimensional transform for the thresholding is based upon at least one of the following functions: Activelet, AMlet, Armlet, Bandlet, Barlet, Bathlet, Beamlet, Binlet, Bumplet, Brushlet, Caplet, Camplet, Chirplet, Chordlet, Circlet, Coiflet, Contourlet, Cooklet, Craplet, Cubelet, CURElet, Daublet, Directionlet, Dreamlet, Edgelet, FAMlet, FLaglet, Flatlet, Fourierlet, Framelet, Fresnelet, Gaborlet, GAMlet, Gausslet, Graphlet, Grouplet, Haarlet, Haardlet, Heatlet, Hutlet, Hyperbolet, Icalet (Icalette), Interpolet, Loglet, Marrlet, MIMOlet, Monowavelet, Morelet, Morphlet, Multiselectivelet, Multiwavelet, Needlet, Noiselet, Ondelette, Ondulette, Prewavelet, Phaselet, Planelet, Platelet, Purelet, QVlet, Radonlet, RAMlet, Randlet, Ranklet, Ridgelet, Riezlet, Ripplet (original, type-I and II), Scalet, S2let, Seamlet, Seislet, Shadelet, Shapelet, Shearlet, Sinclet, Singlet, Slantlet, Smoothlet, Snakelet, SOHOlet, Sparselet, Spikelet, Splinelet, Starlet, Steerlet, Stockeslet, SURE-let (SURElet), Surfacelet, Surflet, Symmlet, S2let, Tetrolet, Treelet, Vaguelette, Wavelet-Vaguelette, Wavelet, Warblet, Warplet, Wedgelet, Xlet.

BRIEF DESCRIPTION OF THE DRAWINGS

FIG. 6 shows an estimate of a deblended seismic signal output decomposed into small overlapping 3-dimensional window cubes.

FIGS. 8A-8D and FIGS. 9A-9D show the improvement in deblending results while using the proposed quadratic thresholding functions over hard and soft thresholding.

FIG. 10 illustrates a flow chart of the present deblending process.

DETAILED DESCRIPTION

Figure 1:
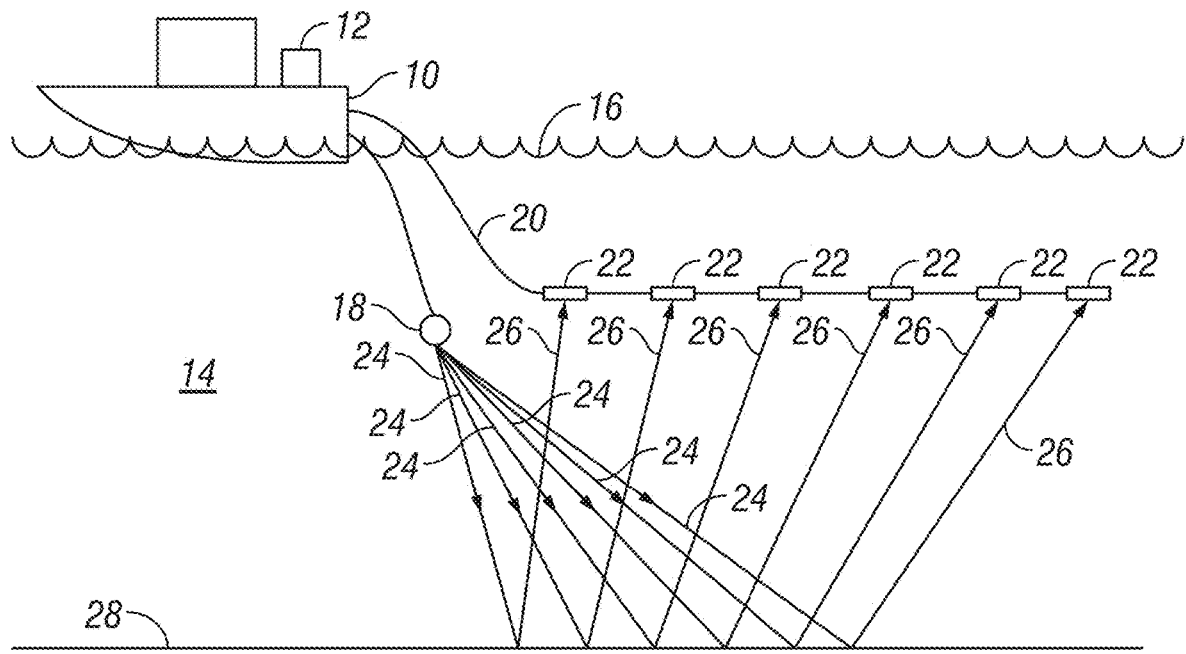
FIG. 1 shows an example embodiment of acquiring seismic signals which may be processed according to methods described in the present disclosure.

FIG. 1 shows an example embodiment of a marine seismic data acquisition system which may be used to acquire seismic data for processing according to various aspects of the present disclosure. A seismic vessel 10 moves through a body of water 14, such as a lake or ocean. For purposes of simplifying the explanation which follows, the seismic vessel 10 is shown towing a single seismic sensor streamer 20. In practical embodiments, a plurality of similarly configured streamers may be towed by the vessel 10. In such embodiments, the seismic vessel 10 tows equipment (not shown) adapted to position the streamers at laterally spaced apart locations behind the seismic vessel 10, and substantially in parallel with each other. Such arrangements of streamers, as is known in the art, are typically used for three-dimensional (3D) seismic surveys. However, it should be clearly understood that the number of streamers is not a limitation on the scope of the present disclosure.

The seismic vessel 10 may include navigation, seismic energy source control, and seismic data recording equipment (referred to for convenience hereinafter collectively as the "recording system") of any type well known in the art and shown generally at 12. The recording system 12 causes at least one seismic energy source 18, which may be towed in the water 14 by the seismic vessel 10, to actuate at various times and/or locations. The seismic energy source ("source") 18 may be any type well known in the art, including air guns, water guns or arrays of such guns. For purposes of describing the various aspects of the present disclosure, the term "source" is intended to mean any individual one or combination of seismic energy sources. The source 18 is shown being towed by the seismic vessel 10, however, in other embodiments, the source 18, or an additional one or more of such seismic energy sources (not shown) may be towed by a different vessel (not shown). In other embodiments, there may be more than one seismic energy source towed from the seismic vessel 10, or another vessel. The actual seismic energy source configuration and number of sources used, and the number and purposes of the particular vessels used are not in any way intended to limit the scope of methods according to the present disclosure.

The streamer 20 includes seismic sensors 22 disposed at spaced apart positions along the streamer 20. Each of the seismic sensors 22 can include a sensor that is responsive to the pressure in the water 14, or to changes in such pressure (such as change in pressure with respect to time). As is well known in the art, the pressure responsive sensor may be a hydrophone, which generates an electrical or optical signal related to the pressure or a signal related to changes therein. The type of the seismic sensors 22 actually used in any acquisition system is not intended to limit the scope of the present disclosure.

During seismic data acquisition, the recording system 12 may cause the source 18 to be actuated at selected spatial positions. When the source 18 is actuated, seismic energy travels outwardly from the source 18, generally downwardly (but in fact in all directions), at 24. Some of the downwardly traveling energy 24 reflects from impedance boundaries, including the water bottom 28 and sub-bottom formation layer boundaries (not shown in FIG. 1). Seismic energy may be reflected from the impedance boundary(ies) 28, whereupon the reflected energy travels upwardly, as shown generally at 26. The upwardly traveling seismic energy 26 is detected by the seismic sensors 22 on the streamer 20.

Figure 2:
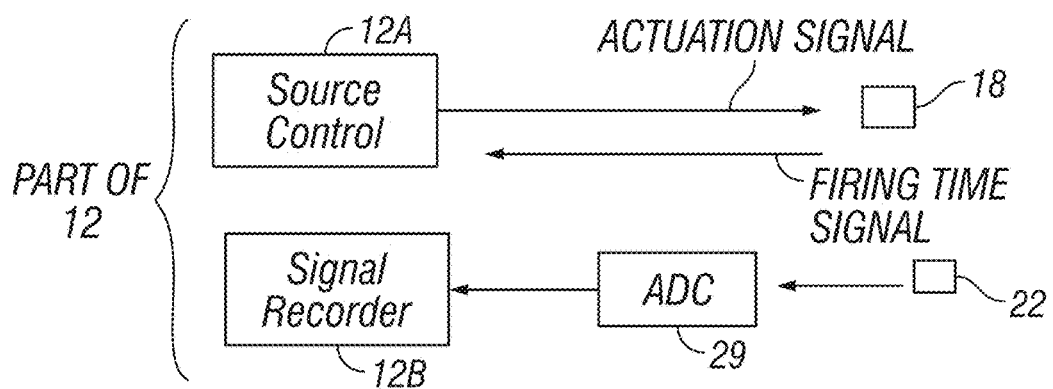
FIG. 2 shows a portion of signal acquisition and recording components of the acquisition system shown in FIG. 1.

FIG. 2 shows certain components of the acquisition system of FIG. 1 in more detail so that description of methods of processing recorded seismic signals may be better understood. The recording system 12 may include, as previously explained, a source controller 12A which generates signals transmitted to the source 18 at various times. In the present example embodiment, those times may be chosen so that the source 18 is actuated at substantially even distance intervals between successive actuations as will be further explained below. When the actuation signals are transmitted to the source 18, components in the source 18 cause the source to "fire" or discharge energy into the water (14 in FIG. 1). In embodiments of a source 18 such as an air gun, the actuation signal operates electro-mechanical devices in the source 18, such as a solenoid operated pneumatic valve, which causes other components in the source to discharge pressure (e.g., air or water) stored in a chamber. The discharge of such pressure may be used to move a shuttle or similar device to actuate a switch (not shown separately) to send an actuation signal back to the recording system 12. Thus, the actual time of discharge of energy by the source 18 may be measured precisely notwithstanding any electromechanical latency in the components of the source 18. An example of an air gun having the above described components and which explains the relationship between the actuation signal and the actual firing time signal is described in U.S. Pat. No. 4,472,794 issued to Chelminski.

In the present example embodiment, the actuation times for the seismic energy source 18 may be chosen so that the source 18 is actuated on a substantially regular distance (spacing) between successive actuations, e.g., every 12.5 meters. In order to actuate the seismic energy source 18 at substantially equal spacing between successive actuations, it is required to predict when to actuate the source 18 based on factors such as the vessel speed and navigational data, among other factors. Such predictions may not be precise and may result in a random and variable time interval between successive actuations of the source 18. The foregoing two examples of actuating a source such that random and variable time interval occurs between successive actuations of the source are only provided to illustrate methods according to the present disclosure. It is only necessary for purposes of methods of the present disclosure to have a variable time interval between successive actuations of the source. The particular method of actuating the source so that a variable time interval occurs between successive actuations of the source is not intended to limit the scope of the present disclosure.

Signals generated by the seismic sensors 22 (only one of which is shown in FIG. 2 for clarity of the illustration) may be conducted to an analog to digital converter (ADC) 29, and then to a signal recorder 12B for making a record with respect to time of the signals detected by each of the seismic sensors 22. Various embodiments of the recording system may include any number of ADCs 29 and such ADCs may be multiplexed to digitize signals from more than one seismic sensor 22 or there may be one ADC 29 for each seismic sensor 22. The hardware configuration used for signal recording is not intended to limit the scope of the present disclosure. In any embodiment, however, the actuation time of the source 18 as communicated to the recording system 12 by the signal generated in the source 18 is known and is recorded by the signal recorder. Contemporaneously, signals detected by each of the seismic sensors 22 are digitized, recorded indexed with respect to time. In some embodiments, the recording may be continuous, that is, there is no interruption in recording between successive actuations of the source 18.

Methods according to the present disclosure make use of variations of the time interval between successive actuations of the source 18. According to one aspect of a method according to the present disclosure there is provided a procedure for deblending interfering seismic energy resulting from the recording of seismic signals from different sources or different actuations of the same source sufficiently close in spacing wherein there is interference between the recordings of signals produced by different source actuations. A result of methods according to the present disclosure is to produce shot records where the seismic energy in each resulting shot record is that from just a single source actuation. Different sources may be, for example, different air gun arrays towed by a vessel such as shown at 10 in FIG. 1 or by another vessel, or any other seismic energy source.

Figure 3:
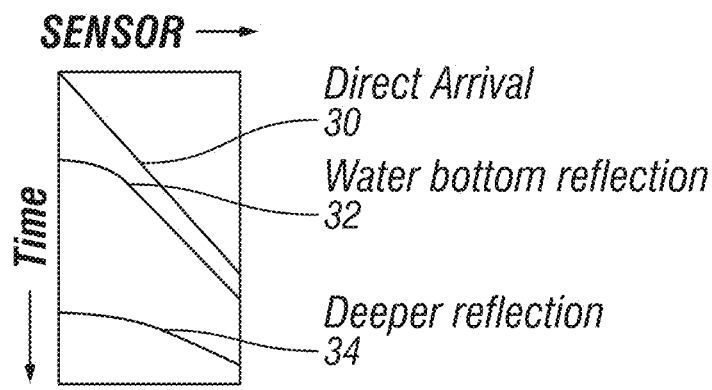
FIG. 3 shows a simplified example of a conventional shot record for an individual actuation of a seismic energy source and example signals detected by each of a plurality of seismic sensors.

Referring to FIG. 3, a schematic representation of a shot record acquired by a single actuation of a seismic energy source is shown. The coordinate (X) axis of the shot record in FIG. 3 represents the sensor from which signals have been recorded. The ordinate (Y) axis represents time, with the actuation time of the source generally being referenced to zero ($t_0$). As will be appreciated by those skilled in the art, an actual shot record presented in the manner of the schematic in FIG. 3 would include individual signal records with respect to time from each individual seismic sensor (22 in FIG. 1). Such individual records are referred to as "traces." For purposes of explaining methods according to the present disclosure, it is not necessary to show the individual traces, but only to show features that may be expected to be observable in each trace in a shot record. In FIG. 3, energy traveling directly through the water (14 in FIG. 1) from the source (18 in FIG. 1) to each sensor (22 in FIG. 1), i.e., the "direct arrival", may be observed as a line 30 representative of a high amplitude event in each trace. The time of the direct arrival may be expected to increase linearly with respect to distance between the source (18 in FIG. 1) and each sensor (22 in FIG. 1). A curve 32 may also be observed in FIG. 3 representing the arrival time with respect to distance between the source and each sensor of reflected seismic energy from the water bottom (28 in FIG. 1). Reflected seismic energy from an impedance boundary below the water bottom (28 in FIG. 1) may be observed as a curve 34 in FIG. 3.

Figure 4:
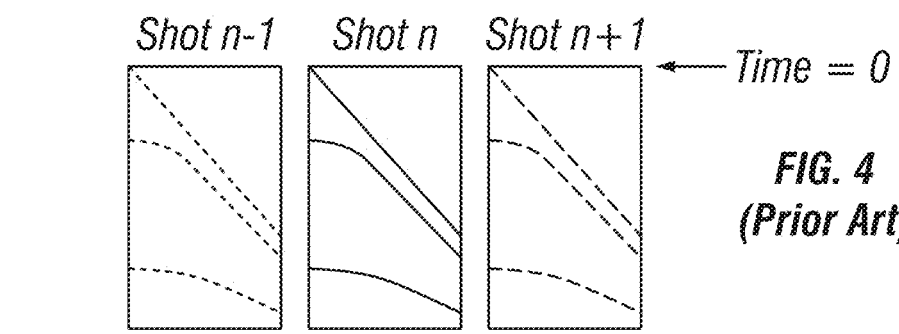
FIG. 4 shows a simplified example of conventional shot records for three successive source actuations.

FIG. 4 shows schematic presentations of three successive shot records acquired such that there is substantially no energy from any other actuation of the source in the shot record corresponding to a source actuation for which the shot record is displayed. In FIG. 4, the center shot record (Shot n) is one for which an output shot record is to be generated using a method according to the present disclosure. One immediately preceding shot record is indicated by "Shot n−1" and one immediately following shot record is indicated by "Shot n+1." In FIG. 4, the individual shot records are obtained such that each shot record includes in its recorded seismic signals energy that results only from the actuation of the seismic energy source associated with the particular shot record. In other words, the time and/or spatial separation between Shot n−1, Shot n, and Shot n+1 in FIG. 4 is large enough that essentially no energy from preceding or successive shots is present in each shot record. The same features as explained with reference to FIG. 3, namely the direct arrival, water bottom reflected arrival and sub bottom reflected arrival are also observable in the three shot records shown in FIG. 4.

Figure 5:
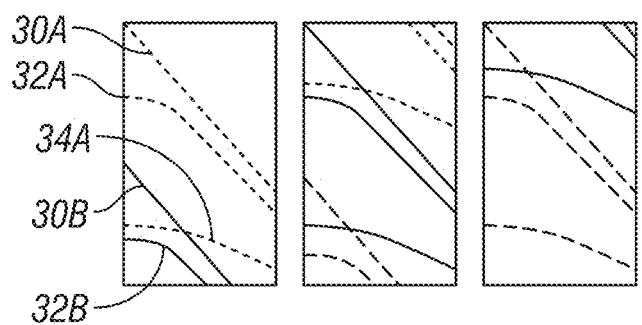
FIG. 5 shows a simplified example of three successive shot records wherein detected seismic signals in the shot record result from more than one actuation of a seismic energy source.

FIG. 5 shows schematic representations of shot records made, in the present example embodiment, by actuating the seismic energy source (18 in FIG. 1) such that within the recording time interval of the shot record, energy resulting from prior and later actuations of the seismic energy source may be observed. Such energy may be referred to as interfering or overlapping energy. For shot record Shot n−1 in FIG. 5, the direct arrival 30A, water bottom reflection arrival 32A and sub bottom reflection arrival 34A may be observed. The actuation record for Shot n−1 may take place at a time prior to the actuation record for Shot n. In the referenced shot record, the direct arrival energy from the succeeding actuation (Shot n) may be observed at 30B and the water bottom reflection arrival may be observed at 32B. The recording time interval associated with Shot n−1 shown in FIG. 5 may be shorter than would enable observation of sub bottom reflections resulting from actuation of the source at Shot n. In a schematic representation of the shot record for Shot n, that is, the actuation of the source immediately following Shot n−1, some of the reflected arrivals from Shot n−1 and some arrivals from Shot n+1 may be observed. Similarly, in the schematic representation of the shot record for the source actuation following Shot n, that is, Shot n+1, some energy resulting from Shot n may be observed.

1. Theory of Operation of Methods According to the Present Disclosure

Seismic data acquired using a "blended" seismic acquisition method (e.g., with overlap as explained with reference to FIGS. 3 and 5) may be denoted as d(t, r, s), where t, r, and s represent time, receiver and source indices, respectively. Let m(t, r, s) represent the desired deblended seismic data based on source actuations that have been fully separated, acquired in a seismic acquisition survey as explained above. The blended seismic data (d) can be written in operator form as follows:

$$d = \Gamma m \quad (1)$$

where $\Gamma$ is a blending matrix that describes the actuation times of the individual seismic energy sources. Eq. (1) can be termed the "forward model" of blending. Each row in the blending matrix $\Gamma_i$ is related to a blended shot record and its elements $\Gamma_{ij}$ are source codes that may be phase and/or amplitude terms. For example, in the simple case of marine survey with random firing times between successive shots, the elements of the blending matrix can be expressed as:

$$\Gamma_{ij} = e^{-i\omega \tau_{ij}} \quad (2)$$

where, $\tau_{ij}$ is the time of actuation of the source or sources j in the $i^{th}$ blended source array. Similarly, in the case of vibratory seismic sources, the elements of the blending matrix may be expressed as:

$$\Gamma_{ij} = e^{-i\beta_{ij}\omega^2} \quad (3)$$

which is a quadratic phase term describing the frequency sweep of vibratory sources. To retrieve individual "deblended" shot records (m) from blended data (d) using Eq. (1), a blending matrix inversion may be performed. Such inversion is an under-determined problem as (d) has fewer rows than (m). As a consequence, a direct matrix inversion of the blending matrix cannot be performed. In the present example embodiment, an objective function can be formulated to obtain the deblended output, as follows:

$$J = \left\| d - \frac{1}{\sqrt{b}} \Gamma m \right\|_2^2 \tag{4}$$

where b is a blending factor, that is, the number of sources blended together in one blended shot-record. The scaling of the blending matrix by the square root of the blending factor is used to obtain convergence of the above objective function. Since this is an under-determined system of equations, there is an infinite number of solutions to Eq. (4). Therefore, additional constraints may be used in order to obtain a unique solution. The choice of constraints reflects prior assumptions about the solution.

As described in other publications, the "signal" (i.e., a perfectly deblended result) appears to be coherent and the interference (overlapping energy from other shots) appears to be incoherent in all domains except the common shot domain. Every trace belongs to a different source in other domains; therefore, the noise appears with different residual phase shifts for every trace. This causes the incoherent character of noise in these domains. However, the signal is at its correct time for all traces, so it appears coherent in all domains. This is a fundamental property of blended surveys which is exploited as a coherency constraint for solving equation (4). To use a coherency constraint, there must be at least some randomness in the source actuation times between the interfering sources (Abma et al., 2015). In a continuous recording experiment, a seismic source is actuated such that the actuation time overlaps weak signal from an earlier source actuation and recovery of the weak signal is a well-known significant challenge due to less randomness in the firing times. An improved following iteration to solve the deblending problem of Eq. (4) may be presented as:

$$m^i = \lfloor m^{i-1} \rfloor + \frac{1}{\sqrt{b}} \Gamma^H \left( d - \frac{1}{\sqrt{b}} \Lambda(\Gamma \lfloor m^{i-1} \rfloor) \right) \tag{5}$$

where $m^i$ is the deblended output estimate on iteration i. The superscript H represents the complex conjugate transpose of the blending matrix. The operator $\lfloor . \rfloor$ indicate a type of thresholding operator and the operator $\Lambda(.)$ denotes a time trimming (truncation) operator, which removes time samples in each shot record at times larger than a predetermined recording time for each shot record. The proposed iteration is significantly different than the constructive deblending method disclosed in Abma (2010), where the previous estimate of the model ($m^{(i-1)}$) contributes to the new estimate of $m^i$ without first applying thresholding into it. Also, the effectiveness of the present example embodiment of a deblending method relies on the manner in which the thresholding operation is performed and the manner in which the threshold is gently relaxed to finally reconstruct the shots as if they had been acquired separately. This will be described in more detail below.

2. The Thresholding Operation

In this section, a thresholding operator $\lfloor . \rfloor$ is described, which may be used for an iterative method, e.g., Eq. (5). The current estimate of the deblended output may be decomposed into small overlapping 3-D window cubes (See FIG. 6). It may be assumed that each window cube is composed of a superposition of a finite number of linear dips. The synthesis of such a model can be written as a sum of small overlapping tapered window cubes; following the partition of unity, as follows:

$$m = \Sigma_{l=1}^L W_l m_l / \Sigma_{l=1}^L W_l. \tag{6}$$

where the operator W performs the tapering on window cube $m_l$ before summing all the window cubes.

Thresholding may be performed in n-dimensional Fourier space. Therefore, all small windows $m_l(t; r; s)$ are transformed into frequency-receiver-source-wavenumber space $m_l (f, k_r, k_s)$ (FKK space). Although other transforms (e.g., Radon, Curvelet etc.) may produce sparser transformed data, the present embodiment uses multidimensional Fourier transforms because they are faster and have very accurate inverses. The orthogonality of the n-dimension discrete Fourier transform has a fundamental statistical consequence: it transforms white noise into white noise. If $\tilde{d}$ represents the Fourier coefficients of blended data, d, and $\tilde{m}$ are the Fourier coefficients of unblended data, m, then $\tilde{d}=\tilde{m}+\tilde{z}$, where $\tilde{z}$ is the blending noise. The problem of recovering m can be formulated as recovering those few coefficients of m that are substantially nonzero, against a Gaussian white noise background. This motivates the use of a thresholding scheme which eliminates small coefficients and retains large ones. If the Fourier coefficient is of the same order of the noise level, then one cannot separate the signal from the noise. In this situation a good estimator for the Fourier coefficient is zero. In the case when an empirical Fourier coefficient is greater than the noise level a natural estimator for a Fourier coefficient is the empirical Fourier coefficient itself. This idea is called thresholding.

In the present example embodiment, therefore, one may apply thresholding on every window $m_l$ (f, $k_r$, $k_s$) followed by N-dimensional inverse Fourier transform to obtain the thresholded deblended output $\lfloor m^{i-1} \rfloor$. The expression for the thresholded data in the spatial-time domain is given by the following equation:

$$\lfloor m^{i-1} \rfloor = \sum_{l=1}^L W_l FT^{-1}(T_\tau(FT(m_l^{i-1}))) \bigg/ \sum_{l=1}^L W_l \tag{7}$$

where $T_\tau(.)$ is the thresholding function, which is another relevant parameter for the present example method. The thresholding functions will be described further below. The choice of the threshold value ($\tau$) is a very delicate and important statistical problem. On the one hand, a large threshold leads to a large bias of the estimator. On the other hand, a small threshold increases the variance of the smoother. One may choose an initial threshold value as 95% of the maximum amplitude of the maximum norm of all small window cubes in FKK space. In the present example embodiment of the thresholding schedule the value of the threshold is lowered exponentially to zero in the last iteration such that every event in the deblended data will be used in the end. Ideally, after thresholding only the coherent signal is picked up, because the amplitude of the interference noise decreases with each iteration.

3. Thresholding Functions

As stated earlier, it is needed to threshold the Fourier coefficients of the deblended output bit by bit with iteration to recover the deblended shots (m). This is similar to applying a sparsity-promoting norm on a regularization term (which is a model itself in sparsity-promoting transform domains) in addition to the data-fitting term (Eq. (4)), as follows:

$$J = J^{(LS)} + J^{(reg)} = \left\| d - \frac{1}{\sqrt{b}} \Gamma m \right\|_2^2 + \lambda \|Fm\|_s \quad (8)$$

here F is any suitable sparse transform domain and $\lambda$ is a user-defined regularization constant (typically $\lambda \approx 0.1\text{-}0.3$), which controls the strength of the sparsity constraint. The norm $\|.\|_s$ represents any sparsity-promoting norm of preference (e.g., $L_0$, $L_1$ or Cauchy). The thresholding function in some embodiments comprises a smooth function with continuous first and second derivatives in the region above the threshold level. There are mainly two types of thresholding functions used in seismic processing which are called hard and soft thresholding functions. These thresholding functions are actually related to one specific norm regularization. When one uses the objective function (Eq. (8)) with $L_0$ norm then $T_\tau(.)$ in Eq. (7) is a hard-thresholding operator with a threshold value $\tau$, expressed as:

$$T_\tau(\tilde{m}_i) = \begin{cases} \tilde{m}_i & |\tilde{m}_i| > \tau \\ 0 & |\tilde{m}_i| \leq \tau \end{cases} \quad (9)$$

Similarly, when the objective function (equation 8) is used with $L_1$ norm then $T_\tau(.)$ is a soft-thresholding operator with a threshold value $\tau$, expressed as:

$$T_\tau(\tilde{m}_i) = \begin{cases} \tilde{m}_i - \tau \operatorname{sgn}(\tilde{m}_i) & |\tilde{m}_i| > \tau \\ 0 & |\tilde{m}_i| \leq \tau \end{cases} \quad (10)$$

As mentioned above the N-dimensional transform may also be based on a number of other functions such as: Activelet, AMlet, Armlet, Bandlet, Barlet, Bathlet, Beamlet, Binlet, Bumplet, Brushlet, Caplet, Camplet, Chirplet, Chordlet, Circlet, Coiflet, Contourlet, Cooklet, Craplet, Cubelet, CURElet, Curvelet, Daublet, Directionlet, Dreamlet, Edgelet, FAMlet, FLaglet, Flatlet, Fourierlet, Framelet, Fresnelet, Gaborlet, GAMlet, Gausslet, Graphlet, Grouplet, Haarlet, Haardlet, Heatlet, Hutlet, Hyperbolet, Icalet (Icalette), Interpolet, Loglet, Marrlet, MIMOlet, Monowavelet, Morelet, Morphlet, Multiselectivelet, Multiwavelet, Needlet, Noiselet, Ondelette, Ondulette, Prewavelet, Phaselet, Planelet, Platelet, Purelet, QVlet, Radonlet, RAMlet, Randlet, Ranklet, Ridgelet, Riezlet, Ripplet (original, type-I and II), Scalet, S2let, Seamlet, Seislet, Shadelet, Shapelet, Shearlet, Sinclet, Singlet, Slantlet, Smoothlet, Snakelet, SOHOlet, Sparselet, Spikelet, Splinelet, Starlet, Steerlet, Stockeslet, SURE-let (SURElet), Surfacelet, Surflet, Symmlet, S2let, Tetrolet, Treelet, Vaguelette, Wavelet-Vaguelette, Wavelet, Warblet, Warplet, Wedgelet, Xlet.

In their publication describing waveform shrinkage, Bruce and Gao (1996) have shown that due to the discontinuity, hard-thresholding (Eq. (9)) tends to have larger variance that leads to unstable and non-converging results. They have also shown that because of shrinkage all large coefficients tend toward zero. Soft-thresholding (Eq. (10)) tends to have larger bias and leads to less accurate results, although it is stable. It has been found that similar behavior of the present example deblending method takes place while using soft and hard thresholding functions. With reference to, "*Estimation with quadratic loss*" (James and Stein, 1961), one may use a quadratic type of thresholding function which is a compromise between hard and soft thresholding. Quadratic thresholding may have better convergence behavior and may obtain a more accurate result. The quadratic thresholding function may be expressed as:

$$T_\tau(\tilde{m}_i) = \begin{cases} \tilde{m}_i(1 - \tau^n/|\tilde{m}_i|^n) & |\tilde{m}_i| > \tau \\ 0 & |\tilde{m}_i| \leq \tau \end{cases} \quad (11)$$

A more general form of the thresholding function may be expressed as:

$$T_\tau(x_i) = \begin{cases} x_i(1 - \tau^n/|x_i|^n) & |x_i| > \tau \\ 0 & |x_i| \leq \tau \end{cases} \quad (12)$$

for n>1 and where x represents a coefficient. In the present example embodiment described above, $x = \tilde{m}$.

Figure 7:
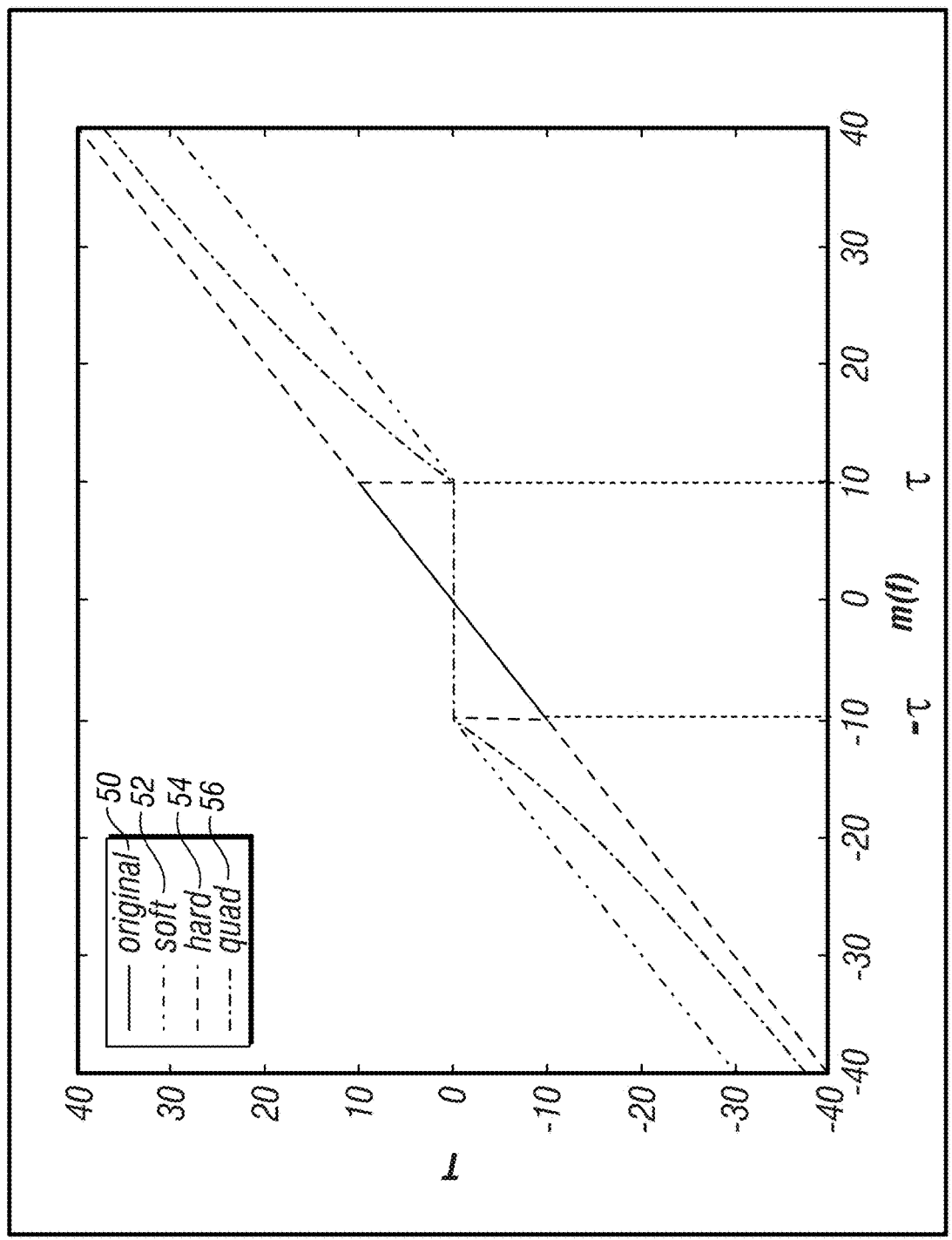
FIG. 7 shows graphs of soft, hard and quadratic thresholding functions.

The above described function can be compared as $L_p$ norm regularization term in the objective function (Eq. (8)) that generates more sparse solutions than $L_1$ norm and more stable solutions than $L_0$ norm regularization. FIG. 7 displays the shape of the original 50 soft 52, hard 54 and quadratic 56 thresholding functions. Note that in the present example embodiment of a thresholding function, shrinking of the coefficients occurs in a quadratic manner such that the largest coefficient values are close to the original coefficient value.

Figure 8D:
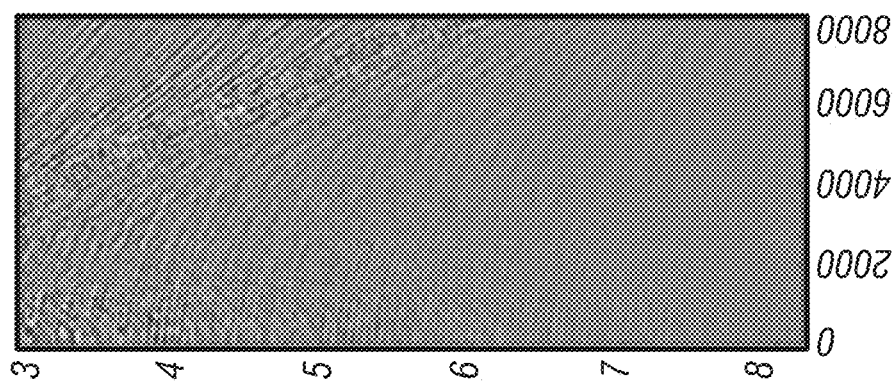
Figure 8C:
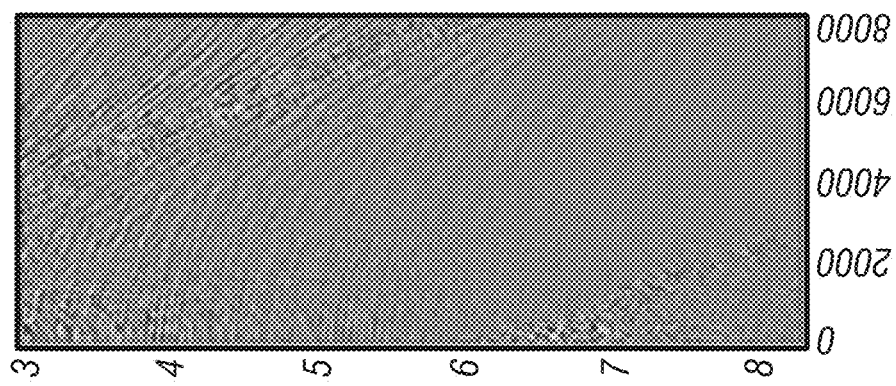
Figure 8B:
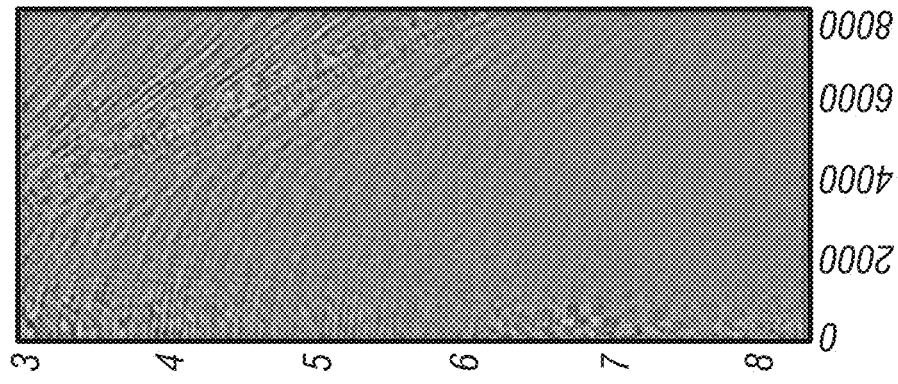
Figure 8A:
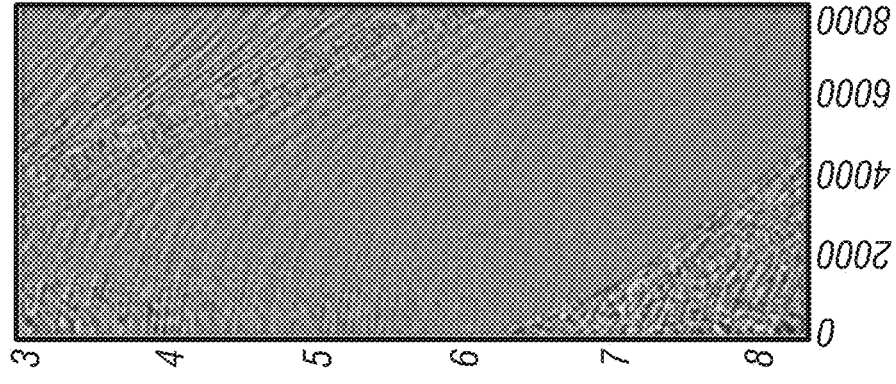

FIGS. 8A-8D and FIGS. 9A-9D show the improvement in deblending results while using the proposed quadratic thresholding functions over hard and soft thresholding. FIG. 8A represents an example of a continuous recording shot-record, where the following shot hides the deeper part of the previous shot-record. The deblended outputs using hard, soft and quadratic thresholding function are shown in FIGS. 8B, 8C and 8D, respectively. Note that a clear separation in the case of using the quadratic thresholding function. FIGS. 9A through 9D represent the same improvement in the common channel domain.

FIG. 10 illustrates a flow chart of the present deblending process. The method starts at 70 by initializing a model and initializing "explained" data at zero. At 72, a set of "unexplained" data, that is data comprising energy from two or more sources, whether from separate physical sources or from one source actuated so as to have time overlap between energy from successive actuations in one or more shot records. At 74, the current model is thresholded in the frequency domain. At 76, a back-projected residual is added to the thresholded model. At 78, the thresholded model is projected onto data space. At 80, if sufficient data have been explained, i.e., the residual is no greater than a selected threshold ($\|r\|_2 \leq \varepsilon$), then the process stops. If insufficient data have been explained, the process returns to 72 and is repeated until the residual falls below the selected threshold.

Deblended seismic data obtained using example embodiments of a process as disclosed herein may be further processed for any know use of seismic data obtained from individual seismic energy sources, for example, imaging.

4. Real Data Example

Figure 11:
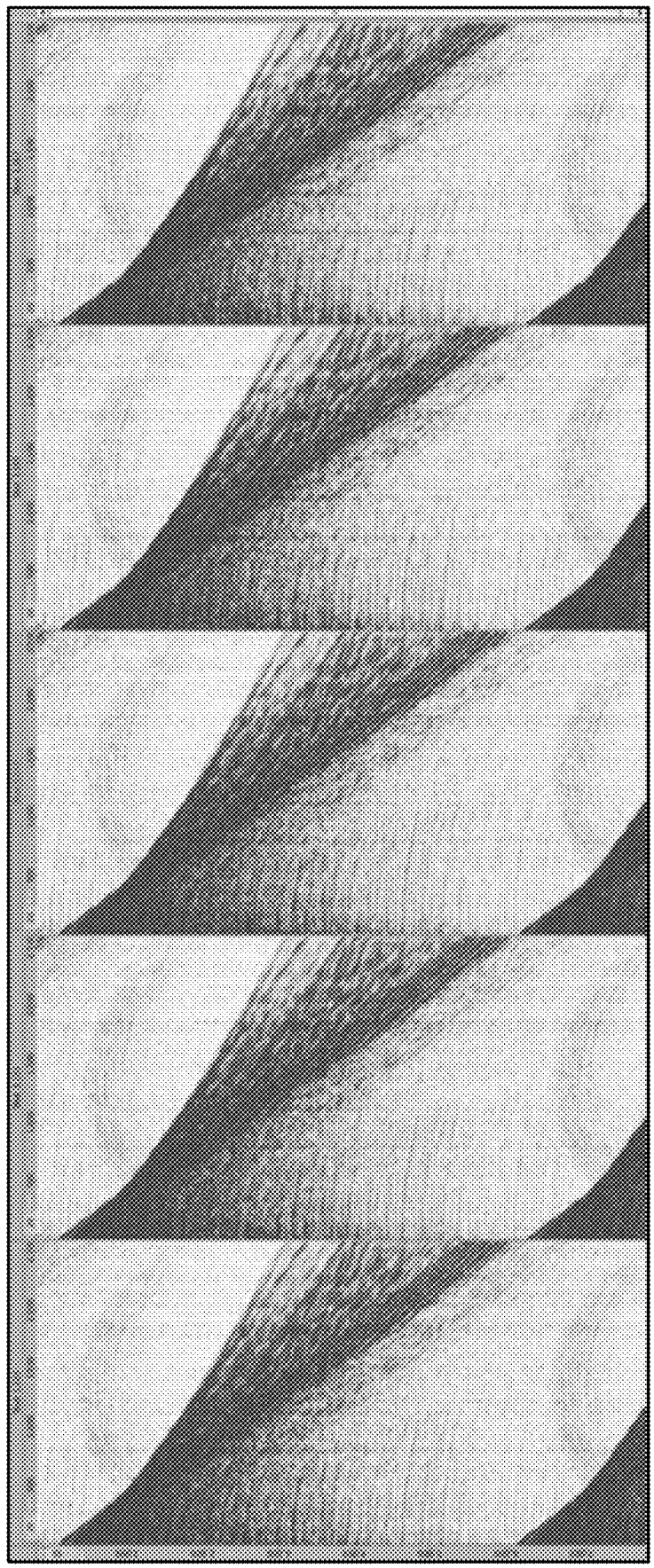
FIG. 11 shows data from five continuous shot records. The desired time length for processing is 8 seconds, however the average time gap between successive shots is about 6 seconds.
Figure 12:
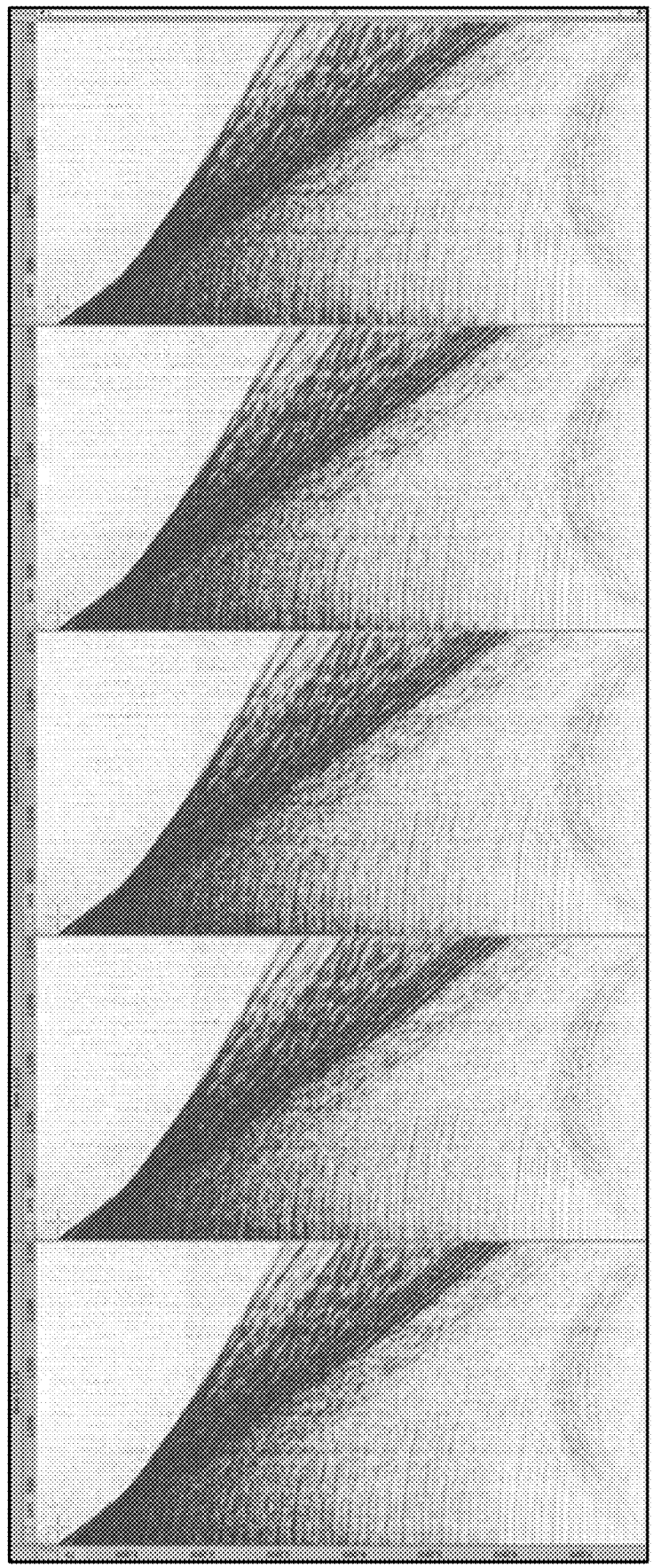
FIG. 12 shows desired deblended shot records.

FIG. 11 shows data from five continuous shot records. The desired time length for processing is 8 seconds, however the average time gap between successive shots is about 6 seconds. Therefore, the overlap of a subsequent shot hides the deep part of the current shot record. Note that the time gap between source firing times is not constant (i.e. the overlapping signals appear at variable times). The variable time between successive shots in the data set will be used in the deblending process. The blending factor for these data is taken as 3, where the central shot ("desired deblended shot") is aligned at time=0 and the delay time from the previous shot to the desired deblended shot of the output record is negative (about −6 seconds) and the delay time from the desired deblended shot to the subsequent shot of the output record is positive (about +6 seconds). The desired deblended shots are shown in FIG. 12.

Figure 13:
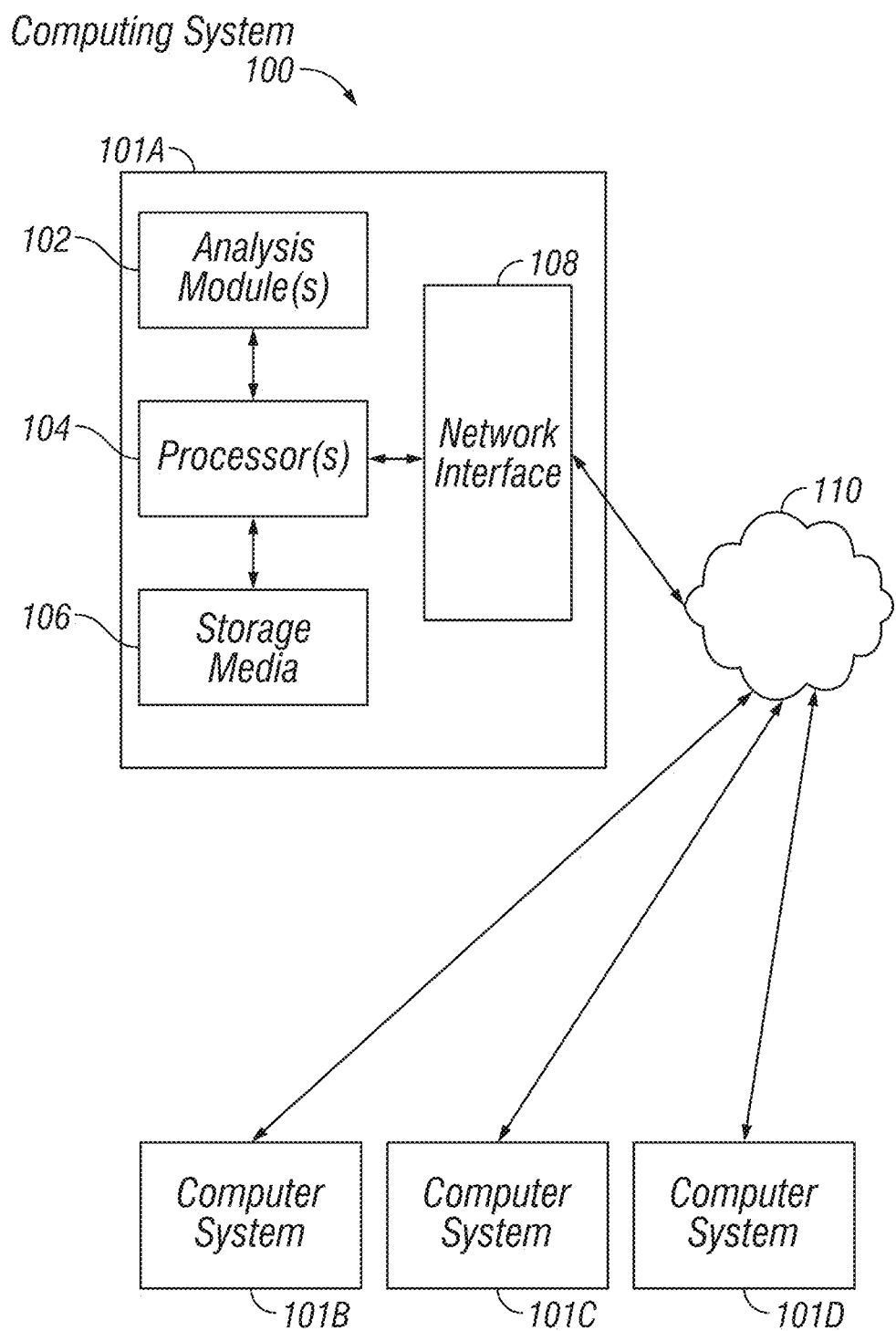
FIG. 13 shows an example computer system that may be used in some embodiments.

FIG. 13 shows an example computing system 100 in accordance with some embodiments. The computing system 100 may be an individual computer system 101A or an arrangement of distributed computer systems. The individual computer system 101A may include one or more analysis modules 102 that may be configured to perform various tasks according to some embodiments, such as the tasks explained with reference to FIGS. 1 through 10. To perform these various tasks, the analysis module 102 may operate independently or in coordination with one or more processors 104, which may be connected to one or more storage media 106. A display device 105 such as a graphic user interface of any known type may be in signal communication with the processor 104 to enable user entry of commands and/or data and to display results of execution of a set of instructions according to the present disclosure.

The processor(s) 104 may also be connected to a network interface 108 to allow the individual computer system 101A to communicate over a data network 110 with one or more additional individual computer systems and/or computing systems, such as 101B, 101C, and/or 101D (note that computer systems 101B, 101C and/or 101D may or may not share the same architecture as computer system 101A, and may be located in different physical locations, for example, computer systems 101A and 101B may be at a well drilling location, while in communication with one or more computer systems such as 101C and/or 101D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 106 may be implemented as one or more computer-readable or machine-readable storage media. Note that while in the example embodiment of FIG. 13 the storage media 106 are shown as being disposed within the individual computer system 101A, in some embodiments, the storage media 106 may be distributed within and/or across multiple internal and/or external enclosures of the individual computing system 101A and/or additional computing systems, e.g., 101B, 101C, 101D. Storage media 106 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that the computing system 100 shown in FIG. 13 is only one example of a computing system, and that any other embodiment of a computing system may have more or fewer components than shown, may combine additional components not shown in the example embodiment of FIG. 13, and/or the computing system 100 may have a different configuration or arrangement of the components shown in FIG. 13. The various components shown in FIG. 13 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, GPUs, coprocessors or other appropriate devices. These modules, combinations of these modules, and/or their combination with general hardware are all included within the scope of the present disclosure.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of methods according to the present disclosure.

References cited in this disclosure include the following:

Abma, R., D. Howe, M. Foster, I. Ahmed, M. Tanis, Q. Zhang, A. Arogunmati, and G. Alexander, 2015, *Independent simultaneous source acquisition and processing*: Geophysics, 80, WD37-WD44.

Abma, R. L., 2010, Method for separating independent simultaneous sources.: U.S. Patent Application Publication No. 2010/003984.

Akerberg, P., G. Hampson, J. Rickett, H. Martin, and J. Cole, 2008, *Simultaneous source separation by sparse radon transform*. 70th Ann. Internat. Mtg., Expanded Abstracts, Soc. of Expl. Geophys., 2801-2805.

Beasley, C. J., B. Dragoset, and A. Salama, 2012, *A 3d simultaneous source field test processed using alternating projections: a new active separation method*: Geophysical Prospecting, 60, 591-601.

Berkhout, A. J., Blacquière, G., and Eric Verschuur, E., 2008, *From simultaneous shooting to blended acquisi-*

*tion:* 70th Ann. Internat. Mtg., Expanded Abstracts, Soc. of Expl. Geophys, 2831-2838.

Bruce, A. G., and H. Y. Gao, 1996, *Understanding waveshrink: variance and bias estimation*: Biometrika, 83, 727-745.

Cheng, J., and M. D. Sacchi, 2015, *Separation and reconstruction of simultaneous source data via iterative rank reduction*: Geophysics, 80, V57-V66.

Doulgeris, P., K. Bube, G. Hampson, and G. Blacquiere, 2012, *Convergence analysis of a coherency-constrained inversion for the separation of blended data*: Geophysical Prospecting, 60, 769-781.

James, W., and C. Stein, 1961, *Estimation with quadratic loss*: Proceeds of the Fourth Berkeley Symposium 1, Expanded Abstracts, 361-380.

Kumar, R., H. Wason, and F. J. Hermann, 2015, *Source separation for simultaneous towed-streamer marine acquisition—a compressed sensing approach*: Geophysics, 80, WD73-WD88.

Mahdad, A., P. Doulgeris, and G. Blacquiere, 2011, *Separation of blended data by iterative estimation and subtraction of blending interference noise*: Geophysics, 76, Q9-Q17.

Maraschini, M., R. Dyer, K. Stevens, and D. Bird, 2012, *Source separation by iterative rank-reduction—theory and applications*: EAGE, A044.

Maraschini, M., A. Kielius, B. B., and S. Grion, 2016a, *Record-length extension by rank-reduction de-blending*: EAGE, We LHR2 04.

Maraschini, M., A. Kielius, and S. Grion, 2016b, *Rank-reduction de-blending for record length extension—the example of the Carnarvon basin:* 78th Ann. Internat. Mtg., Expanded Abstracts, Soc. of Expl. Geophys., 4628-4632.

Moore, I., B. Dragoset, T. Ommundsen, D. Wilson, C. Ward, and D. Eke, 2008, *Simultaneous source separation using dithered sources:* 70th Ann. Internat. Mtg., Expanded Abstracts, Soc. of Expl. Geophys., 2806-2810.

Trickett, S., L. Burroughs, and A. Milton, 2012, *Robust rank-reduction filtering for erratic noise:* 74th Ann. Internat. Mtg., Expanded Abstracts, Soc. of Expl. Geophys., 1-5.

van Borselen, R., R. Baardman, T. Martin, B. Goswami, and E. Fromyr, 2012, *An in-version approach to separating sources in marine simultaneous shooting acquisition application to a Gulf of Mexico data set*: Geophysical Prospecting, 60, 640-647.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for deblending seismic signals, comprising:
   (a) entering as input to a computer recorded signals comprising time overlapping seismic energy from a plurality of actuations of one or more seismic energy sources;
   (b) in the computer, initializing a model of deblended seismic data and initializing a blending matrix, the model comprising a plurality of seismic signals each having energy corresponding to only one of the plurality of actuations, the blending matrix comprising times of each of the plurality of actuations;
   (c) in the computer, initializing a blended output as a product of the blending matrix and the model;
   (d) in the computer, calculating a residual as a difference between the blended output and the input recorded signals;
   (e) in the computer, transforming the model into a thresholding domain and applying a thresholding function only to the transformed model to generate a deblended portion, the deblended portion comprising a plurality of seismic signals each having energy corresponding to only one of the plurality of actuations;
   (f) in the computer, inverse transforming the deblended portion to generate a thresholded model;
   (g) in the computer, applying the blending matrix to the thresholded model to generate an updated blended output;
   (h) determining whether a difference between the updated blended output and the input recorded signals falls below a selected limit, wherein the selected limit is related to a scaled objective function, a scale factor for the scaled objective function related to a number of the plurality of actuations; and
   when the difference exceeds the selected limit, in the computer, adding the thresholded model to a back-projected residual comprising a product of the residual and a complex conjugate transpose of the blending matrix to generated an updated model, in the computer, replacing the model at (b) with the updated model and repeating (d) through (h); and
   when the selected difference is below the limit, in the computer, at least one of storing and displaying the updated model as a final output, the final output comprising a plurality of seismic signal sets each having energy corresponding to only one of the plurality of actuations.

2. The method of claim 1 wherein the thresholding function is performed in overlapping N-dimensional windows of predetermined size and wherein N>2, wherein individual results of the thresholding function in the N-dimensional windows are linearly recombined.

3. The method of claim 1 wherein the thresholding function comprises quadratic thresholding.

4. The method of claim 1 wherein the thresholding function comprises a smooth function with continuous first and second derivatives in a region above a threshold level.

5. The method of claim 1 wherein the thresholding function comprises a function of the form:

$$T_\tau(x_i) = \begin{cases} x_i(1 - \tau^n/|x_i|^n) & |x_i| > \tau \\ 0 & |x_i| \le \tau \end{cases}$$

for n>1, and wherein T represents the thresholding function, $\tau$ represents a threshold value, and x represents a coefficient.

6. The method of claim 1 wherein a thresholding schedule for the thresholding function comprises lowering a value of a threshold exponentially to zero.

7. The method of claim 1 wherein an N-dimensional transform for the thresholding function comprises a Fourier transform.

8. The method of claim 1 wherein an N-dimensional transform for the thresholding function comprises a curvelet transform.

9. The method of claim 1 wherein an N-dimensional transform for the thresholding function comprises a tau-p transform.

10. The method of claim 1 wherein an N-dimensional transform for the thresholding function comprises a parabolic radon transform.

11. The method of claim 1 wherein an N-dimensional transform for the thresholding function comprises a hyperbolic radon transform.

12. The method of claim 1 wherein an N-dimensional transform for the thresholding function comprises a single or double focal transform.

13. The method of claim 1 wherein an N-dimensional transform for the thresholding function is based upon at least one of the following functions: Activelet, AMlet, Armlet, Bandlet, Barlet, Bathlet, Beamlet, Binlet, Bumplet, Brushlet, Caplet, Camplet, Chirplet, Chordlet, Circlet, Coiflet, Contourlet, Cooklet, Craplet, Cubelet, CURElet, Daublet, Directionlet, Dreamlet, Edgelet, FAMlet, FLaglet, Flatlet, Fourierlet, Framelet, Fresnelet, Gaborlet, GAMlet, Gausslet, Graphlet, Grouplet, Haarlet, Haardlet, Heatlet, Hutlet, Hyperbolet, Icalet (Icalette), Interpolet, Loglet, Marrlet, MIMOlet, Monowavelet, Morelet, Morphlet, Multiselectivelet, Multiwavelet, Needlet, Noiselet, Ondelette, Ondulette, Prewavelet, Phaselet, Planelet, Platelet, Purelet, QVlet, Radonlet, RAMlet, Randlet, Ranklet, Ridgelet, Riezlet, Ripplet (original, type-I and II), Scalet, S2let, Seamlet, Seislet, Shadelet, Shapelet, Shearlet, Sinclet, Singlet, Slantlet, Smoothlet, Snakelet, SOHOlet, Sparselet, Spikelet, Splinelet, Starlet, Steerlet, Stockeslet, SURE-let (SURElet), Surfacelet, Surflet, Symmlet, S2let, Tetrolet, Treelet, Vaguelette, Wavelet-Vaguelette, Wavelet, Warblet, Warplet, Wedgelet, Xlet.

14. The method of claim 1 wherein the thresholding domain enhances a sparse representation of predictable signals.

15. A method for seismic surveying, comprising:
actuating at least one seismic energy source;
recording signals generated by at least one seismic sensor in response to the actuating, the actuating performed such that energy from different actuations of the at least one source is present in the recorded signals;
(a) entering the recorded signals as input to a computer;
(b) in the computer, initializing a model of deblended seismic data and initializing a blending matrix, the model comprising a plurality of seismic signals each having energy corresponding to only one of the plurality of actuations, the blending matrix comprising times of each of the plurality of actuations;
(c) in the computer, initializing a blended output as a product of the blending matrix and the model;
(d) in the computer, calculating a residual as a difference between the blended output and the input recorded signals;
(e) in the computer, transforming the model into a thresholding domain and applying a thresholding function only to the transformed model to generate a deblended portion, the deblended portion comprising a plurality of seismic signals each having energy corresponding to only one of the plurality of actuations;
(f) in the computer, inverse transforming the deblended portion to generate a thresholded model;
(g) in the computer, applying the blending matrix to the thresholded model to generate an updated blended output;
(h) determining whether a difference between the updated blended output and the recorded signals falls below a selected limit, wherein the selected limit is related to a scaled objective function, a scale factor for the scaled objective function related to a number of the plurality of actuations; and
when the difference exceeds the selected limit, in the computer, adding the thresholded model to a back-projected residual comprising a product of the residual and a complex conjugate transpose of the blending matrix to generated an updated model, in the computer, replacing the model at (b) with the updated model and repeating (d) through (h); and
when the selected difference is below the limit, in the computer, at least one of storing and displaying the updated model as a final output, the final output comprising for at least one of the plurality of actuations a plurality of seismic signal sets each having energy corresponding to only one of the plurality of actuations.

16. The method of claim 15 wherein the thresholding function is performed in overlapping N-dimensional windows of pre-determined size wherein N>2, wherein results of the thresholding function in the N-dimensional windows are linearly re-combined.

17. The method of claim 15 wherein the thresholding function comprises quadratic thresholding.

18. The method of claim 15 wherein the thresholding function comprises a smooth function with continuous first and second derivatives in the region above the threshold level.

19. The method of claim 15 wherein the thresholding function comprises a function of the form:

$$T_\tau(x_i) = \begin{cases} x_i(1 - \tau^n/|x_i|^n) & |x_i| > \tau \\ 0 & |x_i| \le \tau \end{cases}$$

for n>1, and wherein T represents a thresholding function, $\tau$ represents the threshold value, and x represents a coefficient.

20. The method of claim 15 wherein a thresholding schedule comprises lowering the value of a threshold exponentially to zero.

21. The method of claim 15 wherein an N-dimensional transform for the thresholding function comprises a Fourier transform.

22. The method of claim 15 wherein an N-dimensional transform for the thresholding function comprises a curvelet transform.

23. The method of claim 15 wherein an N-dimensional transform for the thresholding function comprises a tau-p transform.

24. The method of claim 15 wherein an N-dimensional transform for the thresholding function comprises a parabolic radon transform.

25. The method of claim 15 wherein an N-dimensional transform for the thresholding function comprises a hyperbolic radon transform.

26. The method of claim 15 wherein an N-dimensional transform for the thresholding function comprises a single or double focal transform.

27. The method of claim 15 wherein an N-dimensional transform for the thresholding function is based upon at least one of the following functions: Activelet, AMlet, Armlet, Bandlet, Barlet, Bathlet, Beamlet, Binlet, Bumplet, Brushlet, Caplet, Camplet, Chirplet, Chordlet, Circlet, Coiflet, Contourlet, Cooklet, Craplet, Cubelet, CURElet, Daublet, Directionlet, Dreamlet, Edgelet, FAMlet, FLaglet, Flatlet, Fourierlet, Framelet, Fresnelet, Gaborlet, GAMlet, Gausslet, Graphlet, Grouplet, Haarlet, Haardlet, Heatlet, Hutlet, Hyperbolet, Icalet (Icalette), Interpolet, Loglet, Marrlet, MIMOlet, Monowavelet, Morelet, Morphlet, Multiselectivelet, Multiwavelet, Needlet, Noiselet, Ondelette, Ondulette, Prewavelet, Phaselet, Planelet, Platelet, Purelet, QVlet, Radonlet, RAMlet, Randlet, Ranklet, Ridgelet, Riezlet, Ripplet (original, type-I and II), Scalet, S2let, Seamlet, Seislet, Shadelet, Shapelet, Shearlet, Sinclet, Singlet, Slantlet, Smoothlet, Snakelet, SOHOlet, Sparselet, Spikelet, Splinelet, Starlet, Steerlet, Stockeslet, SURE-let (SURElet), Surfacelet, Surflet, Symmlet, S2let, Tetrolet, Treelet, Vaguelette, Wavelet-Vaguelette, Wavelet, Warblet, Warplet, Wedgelet, Xlet.

28. The method of claim 15 wherein the thresholding domain enhances a sparse representation of predictable signals.

\* \* \* \* \*